(12) United States Patent
Sampson et al.

(10) Patent No.: US 7,004,102 B2
(45) Date of Patent: **\*Feb. 28, 2006**

(54) ADJUSTABLE DRINK HOLDER FOR FISHING BOATS

(76) Inventors: Eric Michael Sampson, 3040 Malcolm Dr., Deltona, FL (US) 32738; Paul Douglas Sampson, 3061 Malcolm Dr., Deltona, FL (US) 32738

( * ) Notice: Subject to any disclaimer, the term of this patent is extended or adjusted under 35 U.S.C. 154(b) by 0 days.

This patent is subject to a terminal disclaimer.

(21) Appl. No.: 10/710,601

(22) Filed: Jul. 23, 2004

(65) Prior Publication Data

US 2006/0016382 A1   Jan. 26, 2006

(51) Int. Cl.
   *B63B 17/00* (2006.01)
(52) U.S. Cl. ..................................... 114/364
(58) Field of Classification Search ............... 114/343, 114/364
   See application file for complete search history.

(56) References Cited

U.S. PATENT DOCUMENTS

| | | | | |
|---|---|---|---|---|
| 2,159,902 A | * | 5/1939 | Lewis | 114/364 |
| 3,010,687 A | * | 11/1961 | Hagberg | 248/515 |
| 3,154,274 A | * | 10/1964 | Hillcourt | 248/538 |
| 3,964,706 A | * | 6/1976 | Adams | 43/21.2 |
| 4,749,162 A | * | 6/1988 | Wanzor | 248/558 |
| D306,396 S | * | 3/1990 | Brushaber | D8/355 |
| 5,289,962 A | * | 3/1994 | Tull et al. | 224/549 |
| 5,823,496 A | * | 10/1998 | Foley et al. | 248/314 |
| 6,591,541 B1 | * | 7/2003 | Cummings | 43/21.2 |

* cited by examiner

Primary Examiner—Stephen Avila

(57) ABSTRACT

A drink holder that is designed to adjust to fit in any angle rod holder and can be easily removed and replaced.

3 Claims, 3 Drawing Sheets

ADJUSTABLE DRINK HOLDER FOR FISHING BOATS

BACKGROUND OF INVENTION

1. Field of the Invention

This invention allows any rod holder on a fishing boat to be utilized as a drink holder, regardless of the angle of the rod holder.

2. Description of Prior Art

Many fishing boats do not come equipped with drink holders; however, almost all fishing boats have rod holders. It would be desirable for a product to be used whenever needed, as a drink holder in place of a rod holder.

A prior design found in U.S. Pat. Des. 415095 (Goldsmith, 1999) shows a boat cup holder that is fixed at a specific angle and has a slot cut down one side. This design has various drawbacks. Rod holders on fishing boats come in various angles; ranging from, but not limited to, vertical to 60 degrees from vertical. The Goldsmith '95 design only fits one angle. Also, the slot up the side makes the Goldsmith '95 design less useful for holding items often found on a fishing boat, such as; cut bait, fishing weights, fishing hooks, and other fishing paraphernalia.

Therefore, it would be desirable if a product could be produced that could overcome these drawbacks of prior art; having the ability to adjust to any angle rod holder, while having a cup portion without a slit cut in it so that it may be able to hold both drinks and other fishing paraphernalia.

SUMMARY OF INVENTION

This invention is a novel drink holder that overcomes the drawbacks of prior designs and allows a person to temporarily utilize any rod holder as a drink holder, or holder of other fishing paraphernalia, regardless of its angle.

REFERENCE NUMBERS 1. Cup Portion 2. Rod Portion 3. Wing Nut 4. Washer 5. Hex Bolt 6. Rod Holder 7. Drink Can

DETAILED DESCRIPTION

Figure 1:
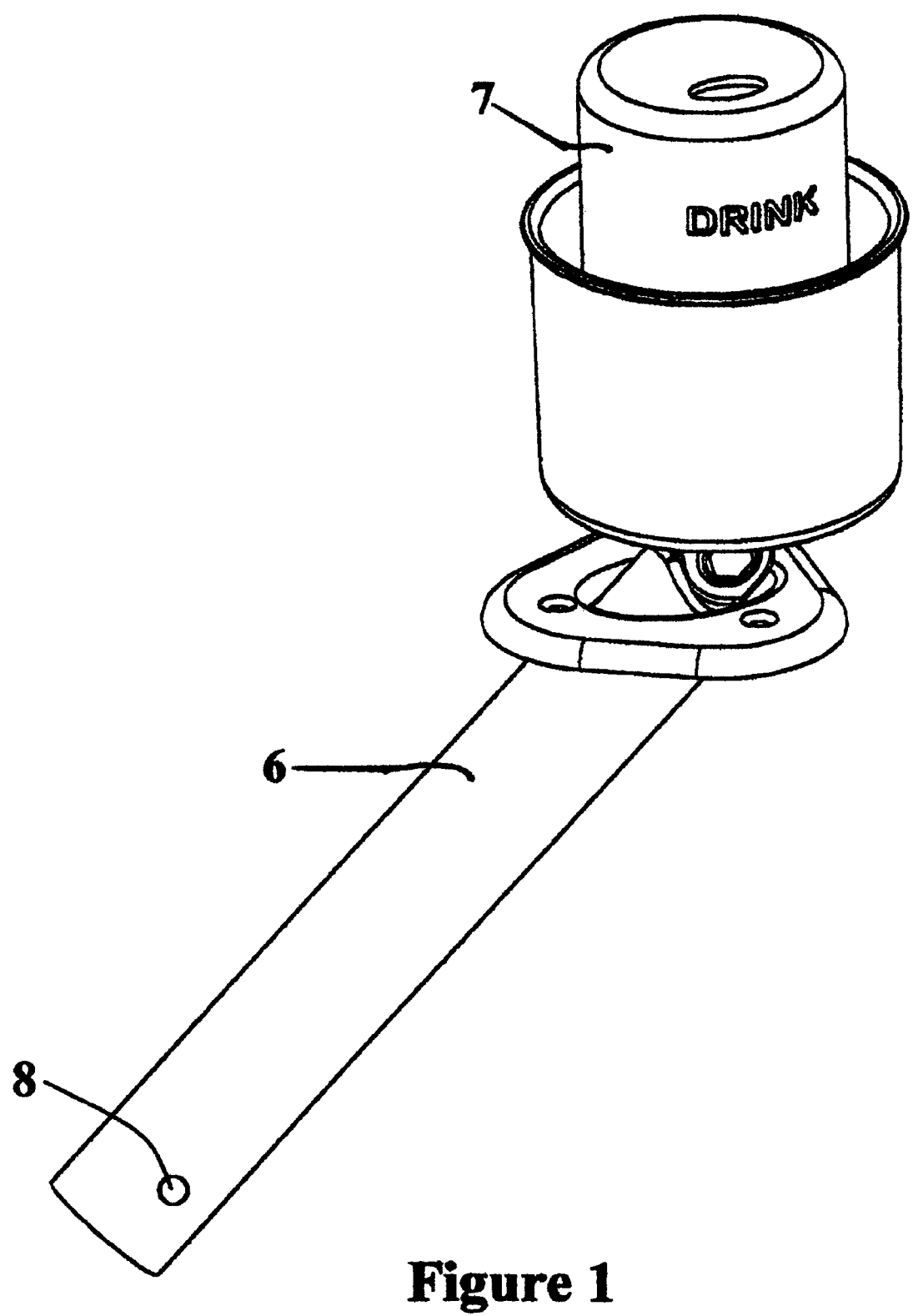
FIG. 1 is a view of the invention holding a drink can, while in an angled rod holder.
Figure 2:
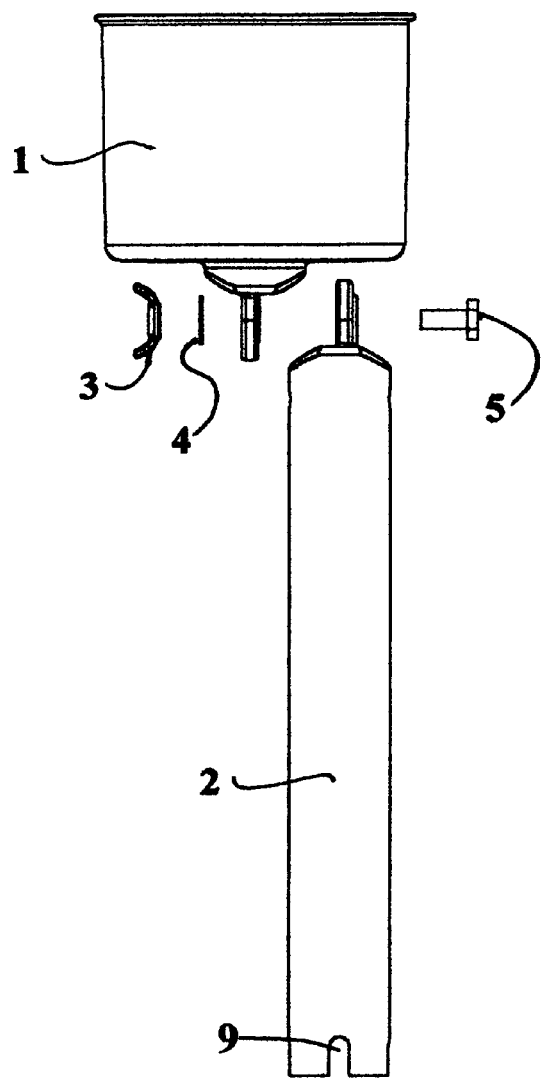
FIG. 2 is an exploded view of the invention.
Figure 3:
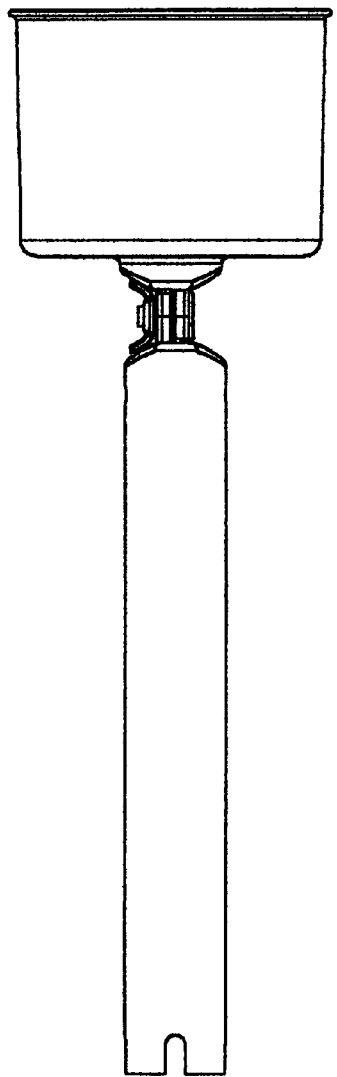
FIG. 3 is an assembled view of the invention.
Figure 4:
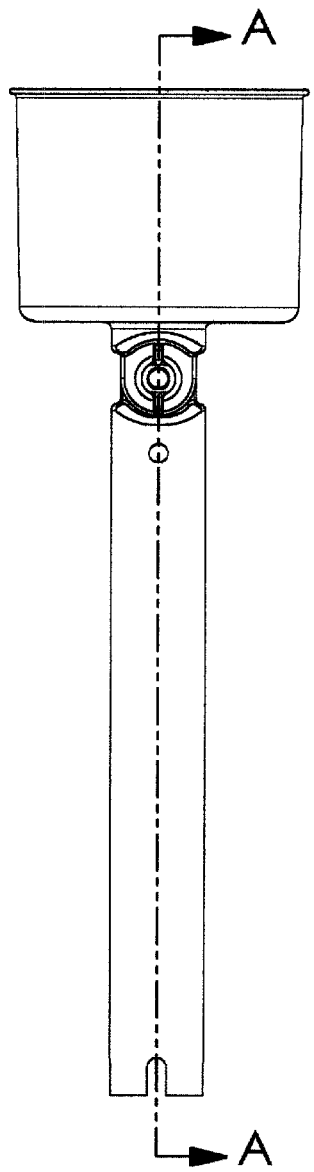
FIG. 4 is a front side view of the invention
Figure 5:
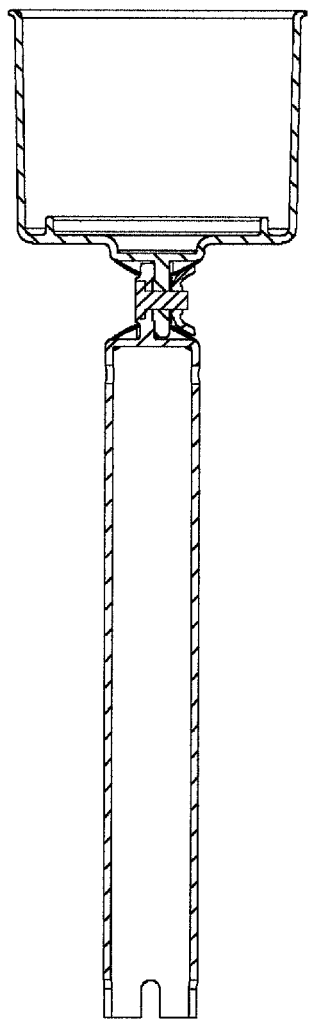
FIG. 5 is a section view (AA) of the front side view (FIG. 4).
Figure 6:
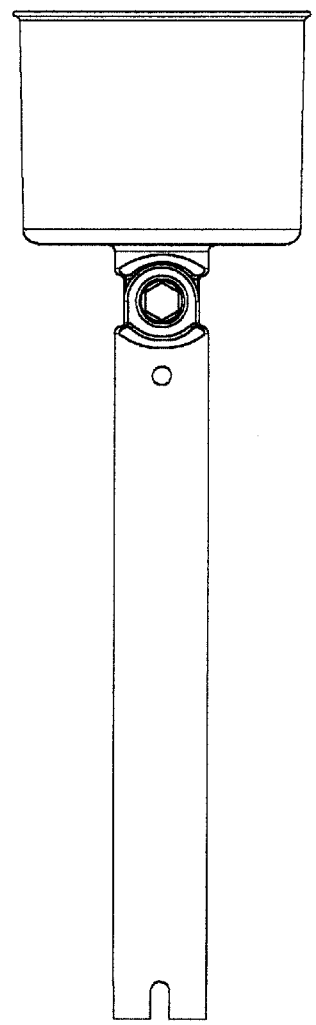
FIG. 6 is a back side view of the invention.

FIG. 1 shows an example of the invention inserted into a rod holder 6 while holding a drink can 7.

The intended operation of this device is as follows: First, insert the bottom of the rod portion 2 into the rod holder 6. Second, turn the rod portion 2 so that the angle of the rod holder 6 is in line with the adjustable angle of the cup portion 1, this will allow the orienting slots 9 at the bottom of the rod portion 2 to align with the orienting pin 8 of the rod holder 6. Third, slide the remaining rod portion 2 into the rod holder 6 until the orienting slots 9 seat securely onto the orienting pin 8 of the rod holder 6. Forth, adjust the cup portion 1 to the desired angle (usually vertical). Fifth, tighten the wing nut 3 to secure the assembly.

Although the present invention has been described herein with respect to preferred embodiments, it will be understood that the foregoing description is intended to be illustrative, not restrictive. Modifications of the present invention will occur to those skilled in the art. All such modifications that fall within the scope of the appended claims are intended to be within the scope and spirit of the present invention.

The invention claimed is:

1. A drink holder for use with a fishing rod holder comprising of:
   a rod portion consisting of hollow cylinder with an open end having 4 equally spaced slots that are wide enough to fit over the orienting pin of a standard rod holder, and a closed end having a round ratchet surface perpendicular to the axis of the hollow cylinder, with a hole in the center of the ratchet surface, and an overall length that is deeper than a standard rod holder, allowing the ratchet portion to be exposed when placed in a rod holder with the slotted end is placed securely in the rod holder;
   a cup portion consisting of a hollow cylinder being open at one end and closed at the other end, with a round ratchet surface perpendicular to the axis created by its hollow cylinder, attached to the closed end with a hole in the center of the ratchet surface;
   a wing nut and bolt;
   assembled with the ratchet surfaces being secured together at any desired angle by the wing nut and bolt.

2. A drink holder as described in claim 1 having a rod portion with a depression in the opposite side of the ratchet surface so that it would capture the bolt head, stopping it from turning during assembly.

3. A drink holder as described in claim 1 having a cup portion with a smaller diameter shallow ring extending from the inside of the cylinders closed end, toward the open end, to assist in holding smaller diameter containers.

* * * * *